US011778234B2

(12) United States Patent
Said et al.

(10) Patent No.: US 11,778,234 B2
(45) Date of Patent: *Oct. 3, 2023

(54) VIDEO INTRA PREDICTION USING HYBRID RECURSIVE FILTERS

(71) Applicant: QUALCOMM Incorporated, San Diego, CA (US)

(72) Inventors: Amir Said, San Diego, CA (US); Xin Zhao, Santa Clara, CA (US); Wei-Jung Chien, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,934

(22) Filed: Sep. 23, 2022

(65) Prior Publication Data
US 2023/0016033 A1    Jan. 19, 2023

Related U.S. Application Data

(63) Continuation of application No. 15/188,766, filed on Jun. 21, 2016, now Pat. No. 11,477,484.
(Continued)

(51) Int. Cl.
H04N 19/61    (2014.01)
H04N 19/117    (2014.01)
(Continued)

(52) U.S. Cl.
CPC ............. *H04N 19/61* (2014.11); *H04N 19/10* (2014.11); *H04N 19/117* (2014.11);
(Continued)

(58) Field of Classification Search
USPC ..................................................... 375/240.02
See application file for complete search history.

(56) References Cited

U.S. PATENT DOCUMENTS 8,036,517 B2    10/2011    Smith et al.
8,873,617 B2 *  10/2014    Segall .................. H04N 19/176
                                                              375/240
(Continued)

FOREIGN PATENT DOCUMENTS

CN    101394560 A    3/2009
CN    103024389 A    4/2013
(Continued)

OTHER PUBLICATIONS

Kim et al., "Description of Video Coding Technology Proposal by ETRI" (The Electronics and Telecommunications ResearchInstitue), Apr. 15-23, 2010 (Year: 2010).*
(Continued)

*Primary Examiner* — Christopher S Kelley
*Assistant Examiner* — Asmamaw G Tarko
(74) *Attorney, Agent, or Firm* — Shumaker & Sieffert, PA

(57) ABSTRACT

An example method of decoding video data includes obtaining, from a coded video bitstream and for a current block of the video data, an indication of an intra-prediction mode that identifies an initial predictive block; filtering, in parallel, samples in a current line of a plurality of lines of the initial predictive block based on filtered values of samples in a preceding line of the plurality of lines and unfiltered values of samples in the current line to generate filtered values for samples for the current line; and reconstructing, using intra prediction, values of samples of the current block based on the filtered values of the samples of the current initial predictive block and residual data for the current block that represents a difference between the filtered values of the
(Continued)

samples of the current initial predictive block and the values of samples of the current block.

20 Claims, 11 Drawing Sheets

Related U.S. Application Data

(60) Provisional application No. 62/183,115, filed on Jun. 22, 2015.

(51) Int. Cl.

| | | |
|---|---|---|
| *H04N 19/82* | (2014.01) | |
| *H04N 19/593* | (2014.01) | |
| *H04N 19/10* | (2014.01) | |
| *H04N 19/192* | (2014.01) | |
| *H04N 19/436* | (2014.01) | |
| *H04N 19/615* | (2014.01) | |
| *H04N 19/70* | (2014.01) | |
| *H04N 19/80* | (2014.01) | |
| *H04N 19/91* | (2014.01) | |
| H04N 19/86 | (2014.01) | |

(52) U.S. Cl.
CPC ......... *H04N 19/192* (2014.11); *H04N 19/436* (2014.11); *H04N 19/593* (2014.11); *H04N 19/615* (2014.11); *H04N 19/70* (2014.11); *H04N 19/80* (2014.11); *H04N 19/82* (2014.11); *H04N 19/91* (2014.11); *H04N 19/86* (2014.11)

(56) References Cited

U.S. PATENT DOCUMENTS

| | | | | |
|---|---|---|---|---|
| 9,088,786 | B2* | 7/2015 | Ikeda | H04N 19/86 |
| 9,154,787 | B2* | 10/2015 | Kumar | H04N 19/436 |
| 11,477,484 | B2 | 10/2022 | Said et al. | |
| 2007/0201559 | A1* | 8/2007 | He | H04N 19/00 |
| | | | | 375/E7.176 |
| 2009/0323808 | A1* | 12/2009 | Lin | H04N 19/577 |
| | | | | 375/E7.123 |
| 2011/0249742 | A1 | 10/2011 | Price et al. | |
| 2012/0218432 | A1 | 8/2012 | Liu et al. | |
| 2012/0230423 | A1* | 9/2012 | Esenlik | H04N 19/80 |
| | | | | 375/E7.2 |
| 2013/0028332 | A1* | 1/2013 | Le | H04N 19/44 |
| | | | | 375/E7.19 |
| 2013/0039421 | A1* | 2/2013 | Lee | H04N 19/82 |
| | | | | 375/E7.243 |
| 2014/0328413 | A1* | 11/2014 | Esenlik | H04N 19/61 |
| | | | | 375/240.29 |
| 2014/0376634 | A1* | 12/2014 | Guo | H04N 19/186 |
| | | | | 375/240.16 |

FOREIGN PATENT DOCUMENTS

| | | |
|---|---|---|
| DE | 69013213 T2 | 3/1995 |
| KR | 20140120397 A | 10/2014 |
| WO | 2007087613 | 8/2007 |

OTHER PUBLICATIONS

Shay et al., "Adaptive In_Loop Prediction Refinement for Video Coding", MMSP 2007 (Year: 2007).*

McCann et al. (Zatacast and Samsung), "Samsung's Response to the Call for Proposals on Video Compression Technology" Video Coding Technology Proposal by Sumsung (and BBC), Apr. 15-23, 2010 (Year: 2010).*

Kim H.Y., et al., "Description of Video Coding Technology Proposal by the Electronics and Telecommunications Research Institute (ETRI)", 1, JCT-VC Meeting, Apr. 15, 2010-Apr. 23, 2010, Dresden, (Joint Collaborative Team on Video Coding of ISO/IEC JTC1/SC29/WG11 and ITU-TSG.16), No. JCTVC-A127, Apr. 21, 2010 (Apr. 21, 2010), pp. 1-37, XP030007579, ISSN: 0000-0049.

Prosecution History for U.S. Appl. No. 01/154,215 dated from Feb. 27, 2018 through Jun. 24, 2022, 206 pages.

International Search Report and Written Opinion—PCT/US2016/038759—ISA/EPO—dated Sep. 15, 2016.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages, please consider section 7.4.9.6 on p. 102, section 8.5.3.2.6 on p. 141, section 8.5.3.2.7 on pp. 141-145, and section 8.5.3.2.8 on p. 145.

Lainema J., et al., "Intra Coding of the HEVC Standard", IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.

Li S., et al., "Rate-Distortion Optimization and Adaptation of Intra Prediction Filter Parameters," IEEE International Conference on Image Processing (ICIP) (2014), Oct. 2014, 5 pp.

Ma J., et al., "Parallel Intra Coding for HEVC on CPU Plus GPU Platform," Visual Communications and Image Processing (VCIP), 2015, pp. 1-4.

Minezawa A., et al.,"Block Boundary Filtering for Intra Prediction Samples," Consumer Electronics (ICCE), 2013 IEEE International Conference on, IEEE, Jan. 11, 2013 (Jan. 11, 2013), XP032348922, DOI: 10.1109/ICCE.2013.6487052 ISBN: 978-1-4673-1361-2, pp. 641-644.

Riechert C., et al., "Real-Time Disparity Estimation Using Line-Wise Hybrid Recursive Matching and Cross-Bilateral Median Up-Sampling", 21st International Conference on Pattern Recognition (ICPR 2012); An IEEE publication from Nov. 11-15, 2012, pp. 3168-3171, Doc. No. 978-4-9906441-0-9 © 2012 ICPR.

Second Written Opinion from corresponding PCT Application Serial No. PCT/US2016/038759 dated Mar. 8, 2017 {8 pages).

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

Yue C., et al., "A Recursive Extrapolation Approach to Intra Prediction in Video Coding," 2013 IEEE International Conference on Acoustics, Speech and Signal Processing (ICASSP); Vancoucer, BC; May 26-31, 2013, Institute of Electrical and Electronics Engineers, Piscataway, NJ, US, May 26, 2013 (May 26, 2013), XP032508839, ISSN: 1520-6149, DOI: 10.1109/ICASSP.2013.6637949 [retrieved on Oct. 18, 2013], pp. 1734-1738.

* cited by examiner

VIDEO INTRA PREDICTION USING HYBRID RECURSIVE FILTERS

RELATED APPLICATIONS

This application is a continuation of U.S. patent application Ser. No. 15/188,766, filed 21 Jun. 2016, which claims the benefit of U.S. Provisional Patent Application No. 62/183,115, filed 22 Jun. 2015, the entire content of each application is incorporated herein by reference.

TECHNICAL FIELD

This disclosure relates to video encoding and decoding and, more particularly, video intra prediction.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265 High Efficiency Video Coding (HEVC) standard, and extensions of such standards. A copy of the finalized HEVC standard (i.e., ITU-T H.265, Series H: AUDIOVISUAL AND MULTIMEDIA SYSTEMS Infrastructure of audiovisual services—Coding of moving video, April, 2015) is available at https://www.itu.int/rec/T-REC-H.265-201504-I/en.

The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. In some examples, such video blocks may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients (i.e., residual transform coefficients), which then may be quantized. The quantized coefficients (i.e., the residual transform coefficients), initially arranged in a two-dimensional array, may be scanned in order to produce a one-dimensional vector of coefficients (i.e., transform coefficients), and entropy coding may be applied to achieve even more compression.

SUMMARY

In one example, a method of decoding video data includes obtaining, from a coded video bitstream and for a current block of the video data, an indication of an intra-prediction mode that identifies an initial predictive block; filtering, in parallel, samples in a current line of a plurality of lines of the initial predictive block based on filtered values of samples in a preceding line of the plurality of lines of the initial predictive block and unfiltered values of samples in the current line to generate filtered values for samples for the current line of the initial predictive block, wherein the plurality of lines comprises either a plurality of rows or a plurality of columns of the video data; and reconstructing, using intra prediction, values of samples of the current block based on the filtered values of the samples of the current initial predictive block and residual data for the current block that represents a difference between the filtered values of the samples of the current initial predictive block and the values of samples of the current block.

In another example, a method of encoding video data includes selecting, for a current block of the video data, an initial predictive block; filtering, in parallel, samples in a current line of a plurality of lines of the initial predictive block based on filtered values of samples in a preceding line of the plurality of lines of the initial predictive block and unfiltered values of samples in the current line to generate filtered values for samples for the current line of the initial predictive block, wherein the plurality of lines comprises either a plurality of rows or a plurality of columns of the video data; and encoding, in a coded video bitstream, an indication of an intra-prediction mode that identifies the initial predictive block and residual data for the current block that represents a difference between the filtered values of the samples of the initial predictive block and the values of samples of the current block.

In another example, a device for encoding or decoding video data includes a memory configured to store a portion of the video data; and one or more processors. In this example, the one or more processors are configured to identify, for a current block of the video data, an initial predictive block; filter, in parallel, samples in a current line of a plurality of lines of the initial predictive block based on filtered values of samples in a preceding line of the plurality of lines of the initial predictive block and unfiltered values of samples in the current line to generate filtered values for samples for the current line of the initial predictive block, wherein the plurality of lines comprises either a plurality of rows or a plurality of columns of the video data; and reconstruct, using intra prediction, values of samples of the current block based on the filtered values of the samples of the current initial predictive block and residual data for the current block that represents a difference between the filtered values of the samples of the current initial predictive block and the values of samples of the current block.

In another example, a non-transitory computer-readable storage medium stores instructions that, when executed, cause one or more processors of a video encoding or decoding device to identify, for a current block of the video data, an initial predictive block; filter, in parallel, samples in a current line of a plurality of lines of the initial predictive block based on filtered values of samples in a preceding line of the plurality of lines of the initial predictive block and unfiltered values of samples in the current line to generate filtered values for samples for the current line of the initial predictive block, wherein the plurality of lines comprises either a plurality of rows or a plurality of columns of the video data; and reconstruct, using intra prediction, values of samples of the current block based on the filtered values of the samples of the current initial predictive block and residual data for the current block that represents a difference between the filtered values of the samples of the current initial predictive block and the values of samples of the current block.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The techniques of this disclosure include techniques for improved video intra prediction using hybrid recursive filters designed for parallel computation. Many video coding standards, such as HEVC, implement intra-prediction. In general, intra-prediction involves the generation of a predictive block for a block that is currently being coded based on reference samples in a picture that is currently being coded.

This disclosure may refer to the picture that is currently being coded as the current picture. Furthermore, this disclosure may refer to the block that is currently being coded as the current block. The video coder may use various intra-prediction modes to generate a predictive block. The intra-prediction modes may include angular intra-prediction modes, a planar intra-prediction mode, and a DC intra-prediction mode.

Figure 1:
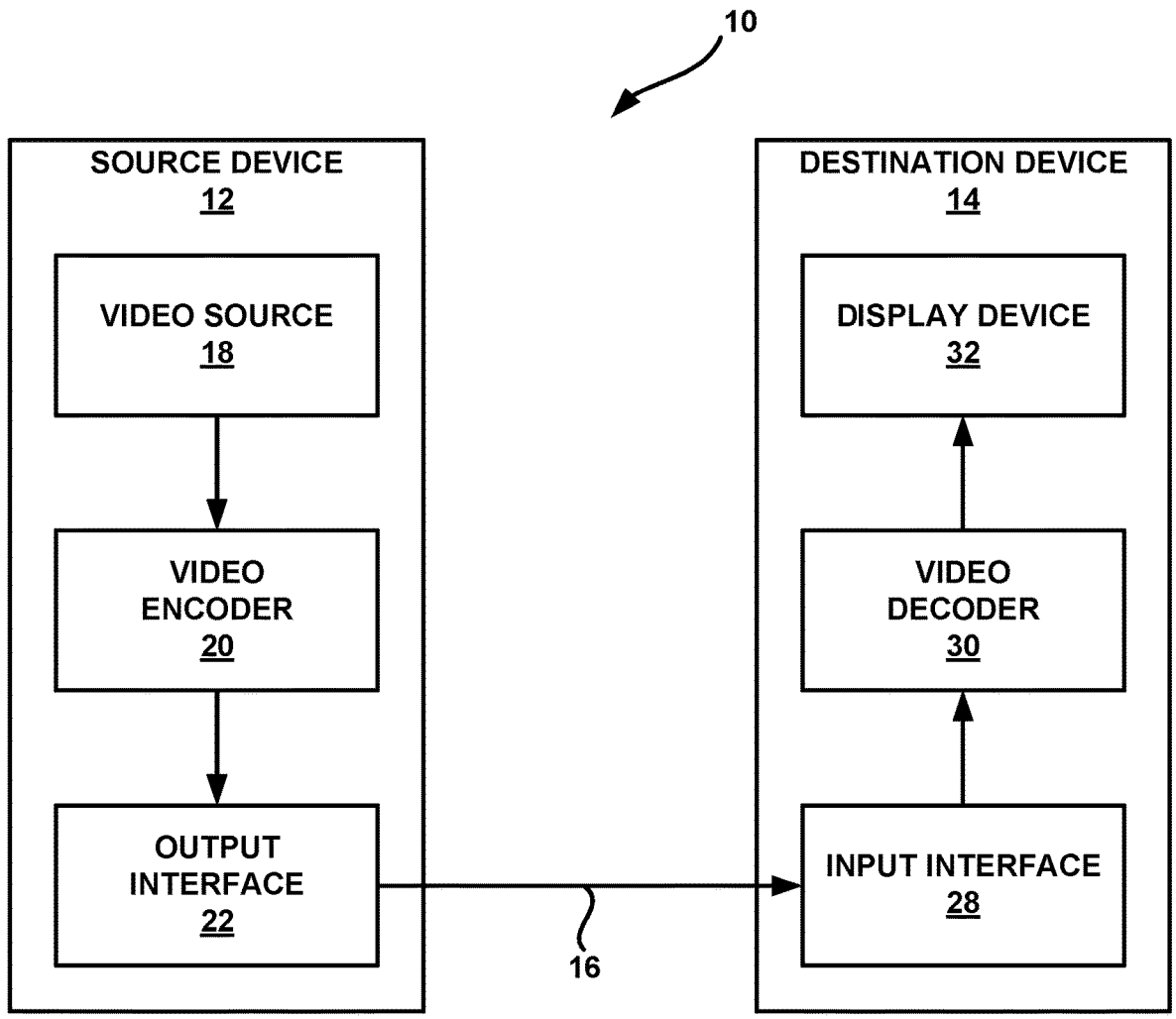
FIG. 1 is a block diagram illustrating an example video coding system that may utilize the techniques described in the present disclosure.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Hence, FIG. 1 is a block diagram illustrating an example video encoding and decoding system 10 that may utilize the techniques described in this disclosure. The techniques described in this disclosure include techniques for improved video intra prediction using hybrid recursive filters designed for parallel computation.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Thus, video coding system 10 includes a source device 12 that generates encoded video data to be decoded at a later time by a destination device 14. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, video streaming devices, in-car computers, or the like. In some cases, source device 12 and destination device 14 may be equipped for wireless communication.

Destination device 14 may receive encoded video data from source device 12 via a channel 16. In other words, source device 12 may provide video data to destination device 14 via channel 16. Channel 16 may also be referred to as a "link." In some examples, channel 16 may comprise a computer-readable medium. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. Thus, in some examples, encoded data may be output from output interface 22 to a storage device. Similarly, encoded data may be accessed from the storage device by input interface. The storage medium (e.g., storage device) may include a variety of locally-accessed data storage media such as Blu-ray discs, DVDs, CD-ROMs, flash memory, or other suitable digital storage media for storing encoded video data. Thus, channel 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and may provide the encoded video data to destination device 14, e.g., via network transmission. Similarly, a computing device of a medium production facility, such as a disc stamping facility, may receive encoded video data from source device 12 and produce a disc containing the encoded video data. Therefore, channel 16 may be understood to include one or more computer-readable media of various forms, in various examples.

In a further example, channel 16 may include a file server device or another intermediate storage device that stores encoded video data generated by source device 12. In this example, destination device 14 may access encoded video data stored at the file server device or other intermediate storage device (e.g., via streaming or download). The file server device may be a type of server capable of storing encoded video data and transmitting the encoded video data to destination device 14. Example file server devices include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server device. The transmission of encoded video data from the file server device may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet (such as such as dynamic adaptive streaming over HTTP (DASH)), encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data. As a further alternative, video source 18 may generate computer graphics-based data as the source video, or a combination of live video, archived video, and computer-generated video.

Video encoder 20 may encode video data (e.g., captured, pre-captured, or computer-generated video) from video source 18. In some examples, source device 12 directly transmits the encoded video data to destination device 14 via output interface 22. In other examples, the encoded video data may also be stored onto a storage medium or a file server device for later access by destination device 14 for decoding and/or playback. In accordance with one or more of the techniques of this disclosure, video encoder 20 of source device 12 may apply techniques for signaling adaptive filter use in intra-prediction. Source device 12 and destination device 14 may each respectively include one or more data storage media configured to store encoded and/or decoded video data.

In the example of FIG. 1, destination device 14 includes an input interface 28, a video decoder 30, and a display device 32. In other examples, source device 12 and destination device 14 may include other components or arrangements. For example, source device 12 may receive video data from an external video source, such as an external camera. Likewise, destination device 14 may interface with an external display device, rather than including an integrated display device.

Input interface 28 may receive encoded video data over channel 16. In some examples, input interface 28 includes a receiver and/or a modem. Video decoder 30 may decode encoded video data. The encoded video data communicated over channel 16, or provided on a storage device, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server device. Thus, in some examples, input interface 28 of destination device 14 receives information from channel 16 (e.g., a computer-readable medium). The information of channel 16 may include syntax information defined by video encoder 20, which is also used by video decoder 30, that includes syntax elements that describe characteristics and/or processing of blocks and other coded units, e.g., groups of pictures (GOPs).

Display device 32 may display the decoded video data (e.g., to a user). Display device 32 may be integrated with or may be external to destination device 14. In some examples, destination device 14 may include an integrated display device and may be configured to interface with an external display device. In other examples, destination device 14 may be a display device. Display device 32 may comprise a variety of display devices, such as a liquid crystal display (LCD), a plasma display, an organic light emitting diode (OLED) display, a cathode ray tube (CRT) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. MUX-DEMUX units may conform to a suitable multiplexer protocol. For instance, if applicable, MUX-DEMUX units may conform to the ITU H.223 multiplexer protocol, or other protocols such as the user datagram protocol (UDP).

Video encoder 20 and video decoder 30 each may be implemented as any of a variety of suitable circuitry (e.g., encoder or decoder circuitry, as applicable), such as one or more microprocessors, digital signal processors (DSPs), application-specific integrated circuits (ASICs), field-programmable gate arrays (FPGAs), discrete logic, hardware, or any combinations thereof. In examples where the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The illustrated system 10 of FIG. 1 is merely one example. Techniques for signaling adaptive filter use in intra-prediction may be performed by any digital video encoding and/or decoding device. Although generally the techniques of this disclosure are performed by a video encoding device, the techniques may also be performed by a video encoder/decoder, typically referred to as a "CODEC." Moreover, a video preprocessor may perform one or more of the techniques of this disclosure. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components.

Video encoder 20 and video decoder 30 may operate according to a video compression standard, such as the ITU-T H.265 (HEVC) standard (Recommendation ITU-T H.265, High efficiency video coding, October 2014), or extensions thereof. Alternatively, video encoder 20 and video decoder 30 may operate according to other proprietary or industry standards, or extensions of such standards.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In this disclosure, the phrase "based on" may indicate "based at least in part on." If video encoder 20 uses inter prediction to generate the predictive blocks of a PU, video encoder 20 may generate the predictive blocks of the PU based on decoded samples of one or more pictures other than the picture associated with the PU.

Figure 2:
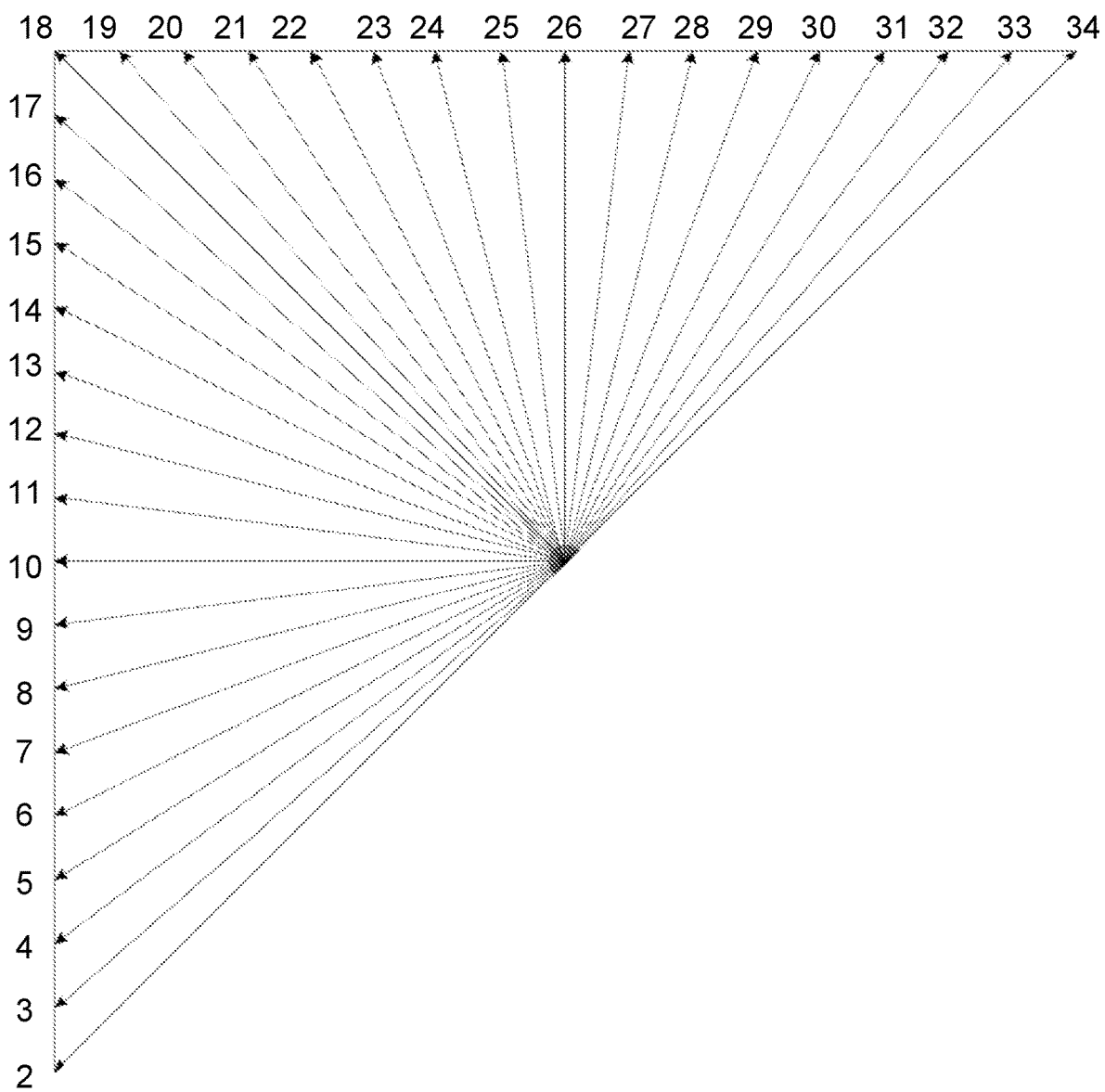
FIG. 2 is a conceptual diagram illustrating example intra-prediction mode directions.

FIG. 2 is a conceptual diagram illustrating example intra-prediction mode directions. When the video coder generates a predictive block according to a directional intra-prediction mode, the video coder may, for each respective sample of the predictive block, assign to the respective sample a value of a reference sample (or a weighted combination of reference samples) that is aligned with the respective sample in a direction corresponding to the directional intra-prediction mode. When a video coder uses a directional (i.e., angular) intra-prediction mode to generate a predictive block for a current block, the video coder may be said to be performing angular intra-prediction. In H.265/HEVC, there may be 35 different predictors available for use when performing intra prediction. Similarly, in H.264/AVC, there may be nine different predictors available for use when performing intra prediction.

To support inter prediction, video encoder 20 may generate one or more reference picture lists. These reference picture lists may be referred to as RefPicList0 and RefPicList1. In some examples, video encoder 20 may generate different reference picture lists for different pictures or different slices of pictures. Hence, different PUs of different pictures and/or slices may be associated with different versions of RefPicList0 and RefPicList1.

Furthermore, when video encoder 20 uses inter prediction to generate a predictive block of a PU, the video encoder may signal motion information for the PU. The motion information may include a reference index for the PU and a motion vector for the PU. The reference index for the PU may indicate a position, within one of the reference picture lists associated with the PU, of a reference picture. The motion vector for the PU may indicate a spatial displacement between a prediction block of the PU and a reference location in the reference picture. Video encoder 20 may use samples of the reference picture associated with the reference location to generate a predictive block for the PU. Because the PU may be associated with two reference pictures, the PU may have two reference indexes and two motion vectors. Hence, a PU may have a RefPicList0 reference index and a RefPicList1 reference index. The PU's RefPicList0 reference index indicates a reference picture in the PU's version of RefPicList0. The PU's RefPicList1 reference index indicates a reference picture in the PU's version of RefPicList1. Similarly, the PU may have a RefPicList0 motion vector and a RefPicList1 motion vector. The PU's RefPicList0 motion vector may indicate a reference location in a reference picture in the PU's version of RefPicList0. The PU's RefPicList1 motion vector may indicate a reference location in a reference picture in the PU's version of RefPicList1.

Video encoder 20 may signal a PU's reference indexes and motion vectors in a bitstream. In other words, video encoder 20 may include, in the bitstream, data indicating the PU's reference indexes and motion vectors. Video decoder 30 may reconstruct the PU's versions of RefPicList0 and/or RefPicList1 and may use the PU's reference indexes and motion vectors to determine one or more predictive blocks for the PU. Video decoder 30 may use the predictive blocks for the PU, along with residual data, to decode samples.

After video encoder 20 generates a predictive block for a PU of a CU, video encoder 20 may generate a residual block for the CU. Each sample of a residual block of a CU may indicate a difference between a sample in one of a predictive block of a PU of the CU and a corresponding sample in one of the coding blocks of the CU. For example, video encoder 20 may generate predictive luma blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb, and Cr residual blocks) of a CU into one or more transform blocks (e.g., luma, Cb, and Cr transform blocks). A transform block may be a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units. NAL units that contain parameter sets (e.g., VPSs, SPSs, PPSs, etc.) may be referred to as parameter set NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Intra-frame prediction may be applied to blocks with N×N samples (i.e., pixels), using a group of samples (e.g., 4N+1 samples) that are adjacent to the block to be predicted. Those reference samples have values that are known at the encoder and decoder when the block prediction is computed. The neighboring reference samples, which may number as many as 2*width+2*height+1 samples, may be used as the reference samples for intra-prediction. Accordingly, these already-reconstructed samples may be referred to as reference samples. In other words, in intra-prediction, the neighboring samples from the top and the left side of a block to be intra-encoded by video encoder 20 or intra decoded by video decoder 30 that are already reconstructed before the deblocking filter are used for the prediction. That is, these top- and left-side pixels may be referred to as reference samples. The reference samples may be reconstructed samples obtained before application of loop-filtering.

Figure 3:
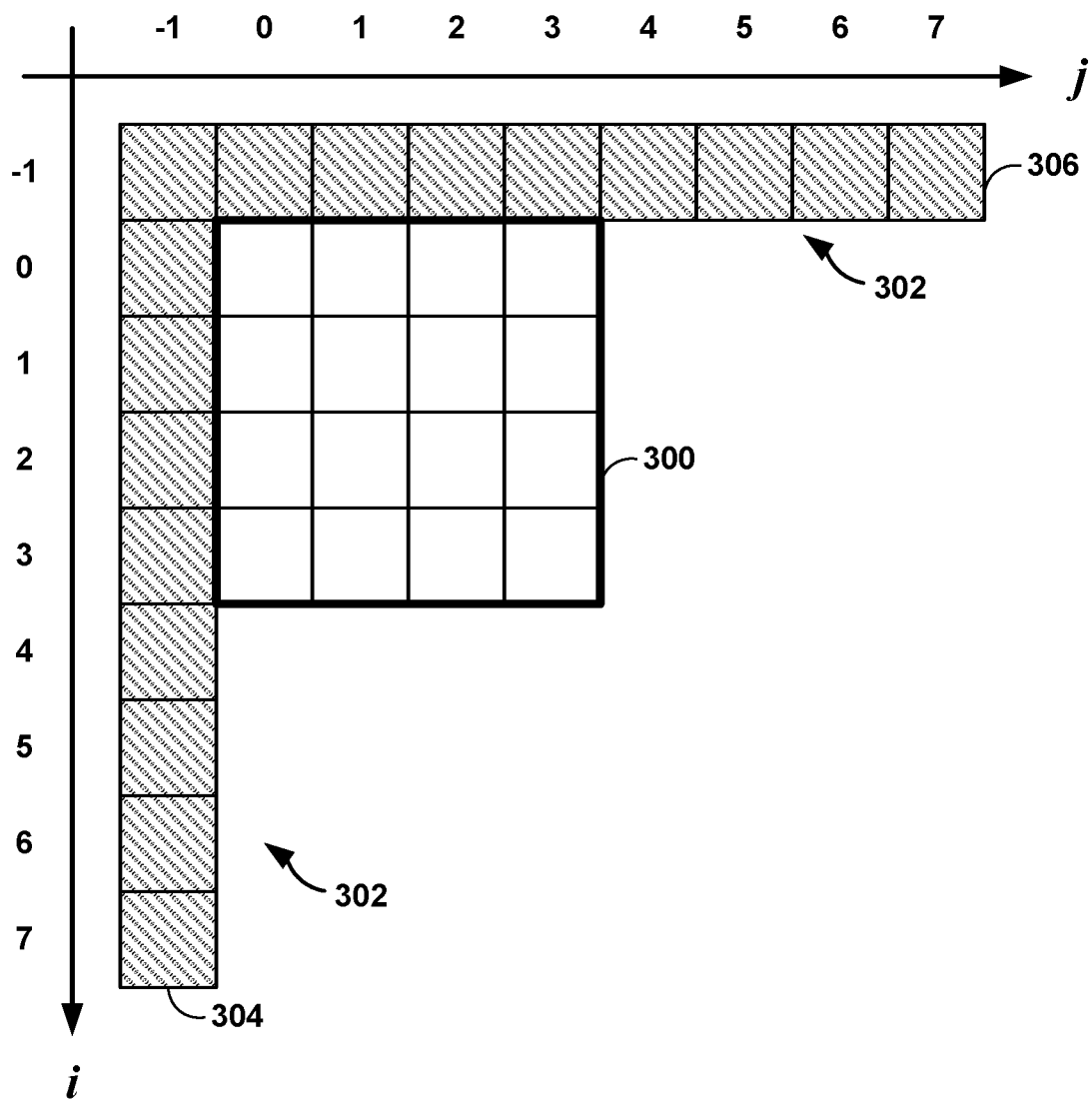
FIG. 3 is a conceptual diagram that illustrates an example technique for intra-prediction

FIG. 3 is a conceptual diagram that illustrates an example technique for intra-prediction. FIG. 3 includes block 300, which is a block of 4×4 samples (white squares), and reconstructed reference samples 302 (shaded squares). As observable from FIG. 3, the set of samples in an N×N block and the predicted values for the samples in the N×N block may be respective defined as shown below in Equation (1).

$$\{x[i,j]\}_{i,j=0}^{N}, \{p[i,j]\}_{i,j=0}^{N} \tag{1}$$

Additionally, even though the reference values may be in one-dimensional arrays, it is convenient to define them using the same set of two-dimensional coordinates as shown below in Equation (2)

$$\{r[i,-1]\}_{i=0}^{2N-1}, \{r[-1,j]\}_{j=0}^{2N-1} \tag{2}$$

As discussed above, to encode block 300 using intra-prediction, video encoder 20 may select a predictive block of already reconstructed samples 302 (i.e., pixel values) that neighbors block 300 and encode an indication of an intra-prediction mode that identifies the predictor block. Video encoder 20 may also encode residual data that represents differences between samples of the predictor block and samples of block 300.

Video decoder 30 may decode block 300 using a process that is generally reciprocal to the process performed by video encoder 20. For instance, video decoder 30 may use the indication of the intra-prediction mode to identify the predictor block for block 300 and add the residual data to the samples of the predictor block to reconstruct the samples of block 300.

As described in K. McCann, W.-J. Han, I.-K. Kim, J. Min, E. Alshina, A. Alshin, T. Lee, J. Chen, V. Seregin, S. Lee, Y. M. Hong, M.-S. Cheon, and N. Shlyakhov, "Video coding technology proposal by Samsung (and BBC)," Tech. Rep. JCTVC-A124, Joint Collaborative Team on Video Coding (JCT-VC) of ITU-T SG16 WP3 and ISO/IEC JTC1/SC29/WG11, Dresden, Germany, April 2010 (hereinafter "McCann"), S. Li, Y. Chen, J. Han, T. Nanjundaswamy, and K. Rose, "Rate-distortion optimization and adaptation of intra prediction fi parameters," in Proc. IEEE Int. Conf. Image Process, Paris, France, October 2014, pp. 3146-3150 (hereinafter "Li"), and Y. Chen, J. Han, and K. Rose, "A recursive extrapolation approach to intra prediction in video coding," in Proc. IEEE Int. Conf. Acoustics Speech Signal Process, Vancouver, BC, Canada, May 2013, pp. 1734-1738 (hereinafter "Chen"), the compression achieved by intra-prediction may be improved by recursively filtering samples of prediction blocks. For example, recursively filtering the samples within prediction blocks may result in smaller residual values, which improves the compression achieved by intra-prediction.

Figure 4:
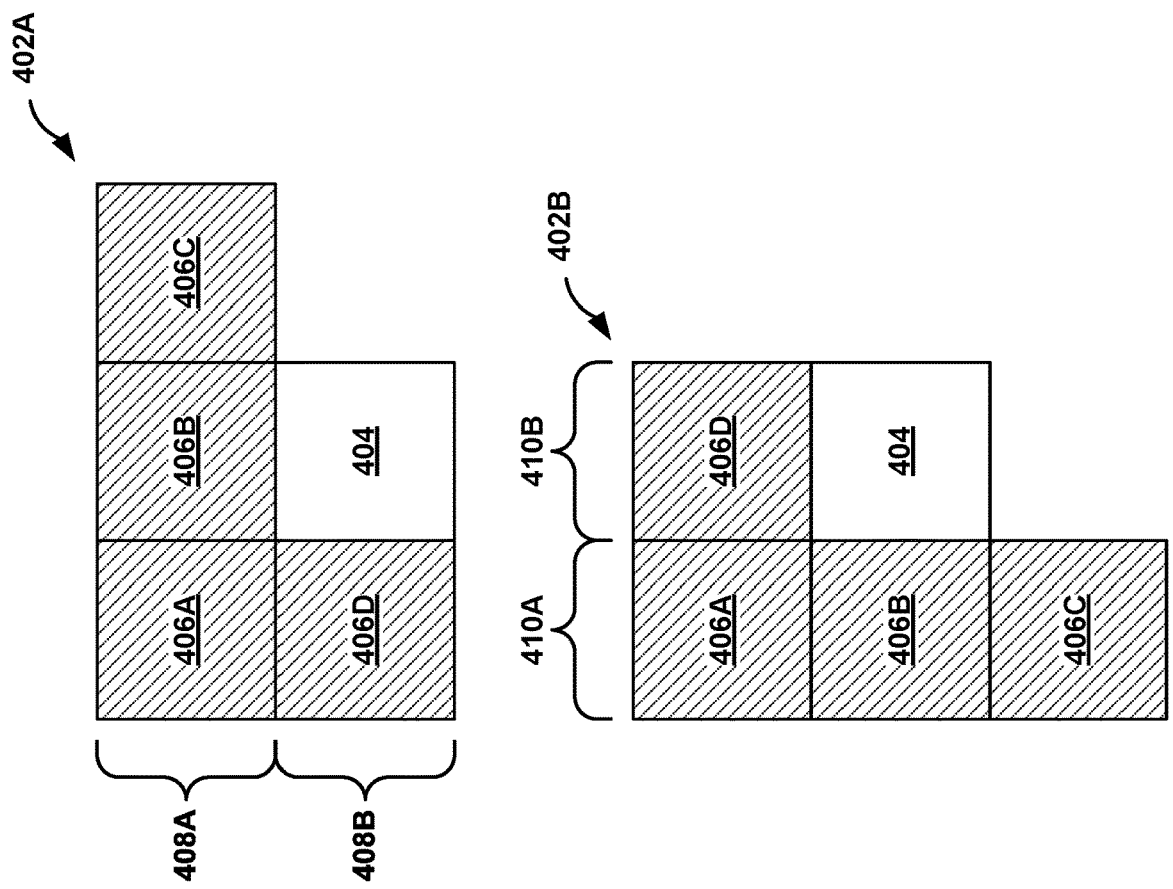
FIG. 4 is a conceptual diagram illustrating example support for recursive filters applied to prediction blocks

FIG. 4 is a conceptual diagram illustrating example support for recursive filters applied to pixels within prediction blocks. FIG. 4 illustrates filter support 402A that may be used to recursively filter samples of block 400 in a horizontal scanning direction, and filter support 402B that may be used to recursively filter samples of block 400 in a vertical scanning direction. In either scanning direction, the recursively filtered values of samples 406A-406D (collectively, "samples 406") may be used to generate a recursively filtered value for sample 404.

To filter a current sample in a current line using either of filter supports 402A and 402B (collectively, "filter supports 402"), a video coder may use the unfiltered value of the current sample, one or more already recursively filtered values of samples in a previous line, and one or more already recursively filtered values of samples in the current line. As one example, where the scanning direction is horizontal, a video coder may generate a recursively filtered value for sample 404 in current row 408B based on the unfiltered value of sample 404, the recursively filtered values of samples 406A-406C in previous row 408A, and the recursively filtered value of sample 406D in current row 408B. As another example, where the scanning direction is vertical, a video coder may generate a recursively filtered value for sample 404 in current column 410B based on the unfiltered value of sample 404, the recursively filtered values of samples 406A-406C in previous column 410A, and the recursively filtered value of sample 406D in current column 410B.

In some examples, it may be desirable to recursively filter a plurality of samples in parallel, such as to decrease processing time. However, the set of recursively filtered values included in each of filter supports 402 do not allow for parallel processing. In other words, a video coder that uses either of filter supports 402 may only recursively filter a single sample at a time, which may not be desirable.

Figure 5:
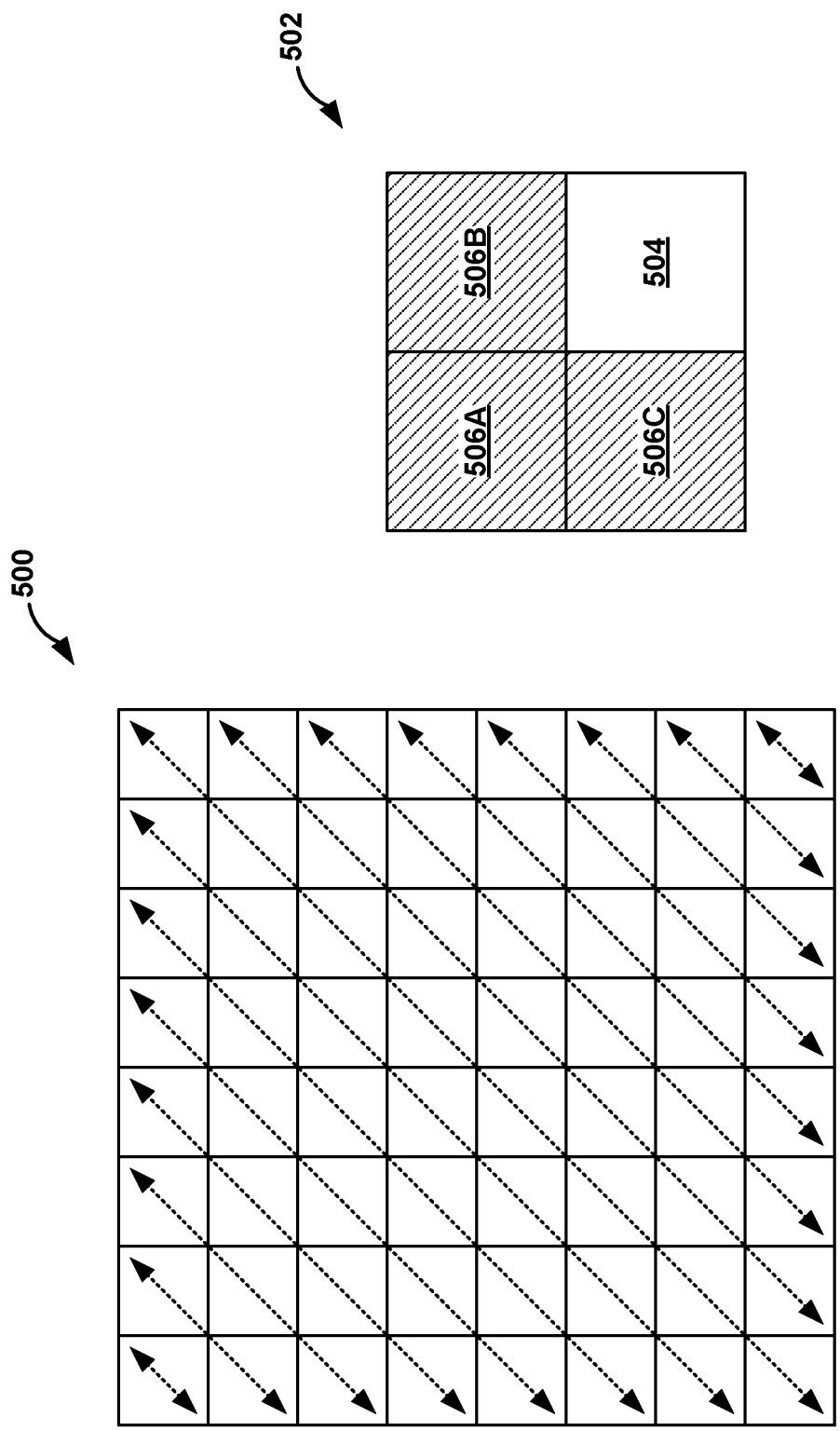
FIG. 5 is a conceptual diagram illustrating example support for a recursive filter applied to prediction blocks

FIG. 5 is a conceptual diagram illustrating example support for a recursive filter applied to prediction blocks. FIG. 5 illustrates filter support 502 that may be used to recursively filter samples of block 500. The recursively filtered values of samples 506A-506C (collectively, "samples 506") may be used to generate a recursively filtered value for sample 504. A video coder may use filter support 502 to generate filtered values for samples by computing new prediction values $\{q[i,j]\}_{i,j=-1}^{N}$ sequentially by first defining some values that are not used as prediction, but are used in the computations, in accordance with Equations (3) and (4), below.

$$q[i,-1]=r[i,-1], i=-1,0,1,\ldots,N-1, \quad (3)$$

$$q[-1,j]=r[-1,j], j=-1,0,1,\ldots,N-1, \quad (4)$$

The video coder may then sequentially compute the filtered values in accordance with Equation (5), where $\alpha$, $\beta$, $\gamma$ and $\delta$ are recursive two-dimensional filter parameters. for i=0, 1, . . . , N−1, and j=0, 1, . . . , N−1:

$$q[i,j]=\alpha q[i-1,j-1]+\beta q[i,j-1]+\gamma q[i,j-1]+\delta p[i,j], \quad (5)$$

As compared to filter supports 402 of FIG. 4, a video coder may use filter support 502 to recursively filter a plurality of samples in parallel due to the geometric arrangement of data dependencies in filter support 502. However, the parallelization of filter support 502 is limited to parallel filtering in groups along diagonals. For instance, in the example of FIG. 5, a video coder may filter the samples along each dashed diagonal line in parallel. This restriction may create some problems, including the fact that the number of samples that may be filtered in parallel increases from 1 to N, and then decreases back to 1.

Another problem is that there is only so much compression improvement that can be obtained with the use of only four filter parameters (filter taps). As such, one way to achieve better compression is to increase the support (number of taps) of the recursive filter. For instance, Li describes that the compression may be improved by filtering of the filtering sequence can be along the horizontal or vertical direction, and using filter support 402A or 402B of FIG. 4, which each include five parameters. However, as discussed above, it is not possible to perform parallel filtering when using filter support 402A or 402B of FIG. 4.

In accordance with one or more techniques of this disclosure, a video coder (e.g., video encoder 20 and/or video decoder 30) may use a hybrid-recursive filer to generate filtered values for samples of a predictive block. The filter may be considered to be hybrid-recursive because the filter support includes both filtered values and unfiltered values of samples other than the sample being filtered. For instance, a video coder may filter, in parallel, (1) samples in a current line of a plurality of lines of a predictive block based on filtered values of samples in a preceding line of the plurality of lines of the predictive block and (2) unfiltered values of samples in the current line to (3) generate filtered values for the samples in the current line of the predictive block. In this way, the techniques of this disclosure enable a video coder to filter a consistent number of samples in parallel with more than three taps.

Figure 6A:
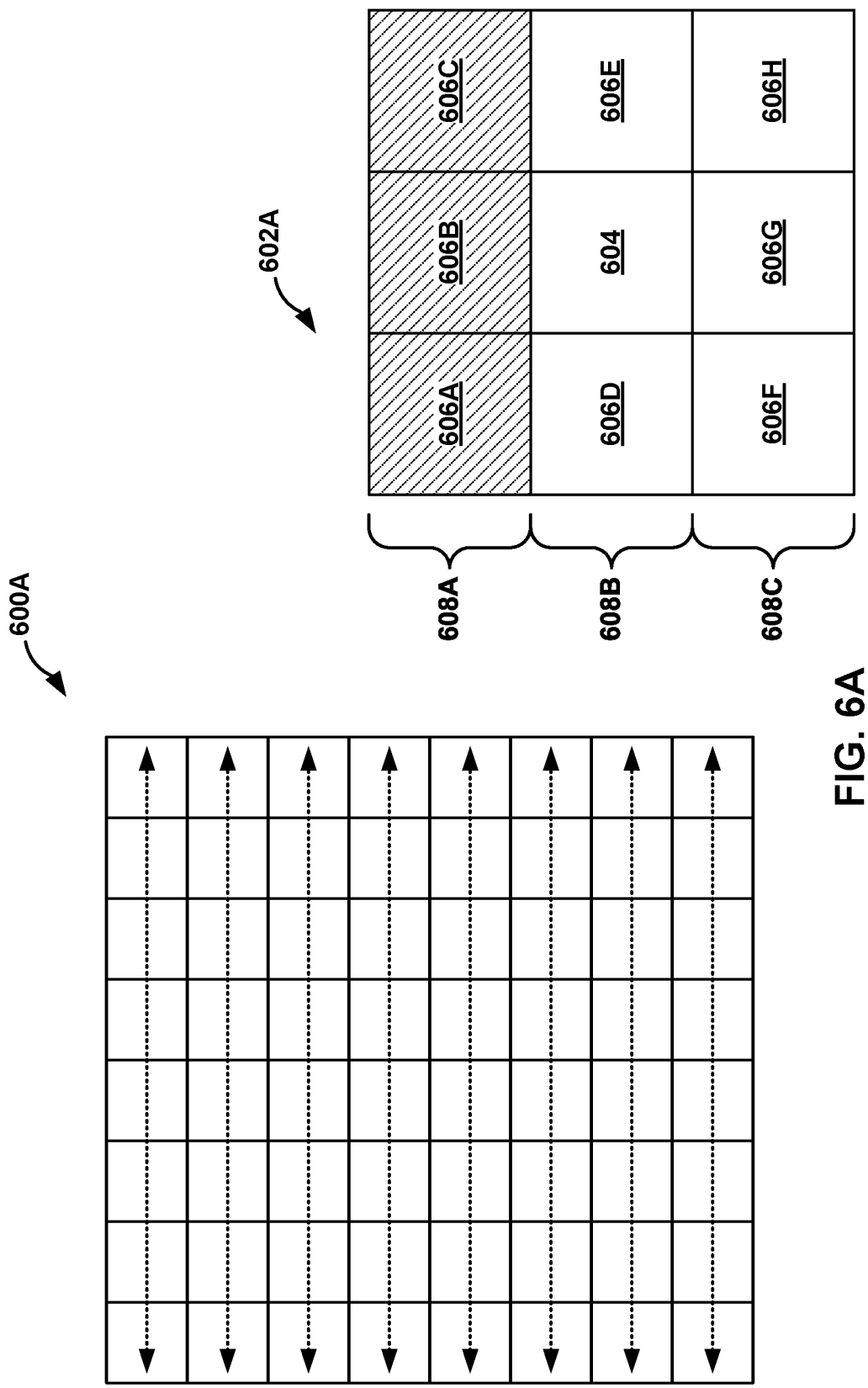
FIGS. 6A and 6B are conceptual diagrams illustrating example supports for a recursive filter applied to prediction blocks, in accordance with one or more techniques of the present disclosure.
Figure 6B:
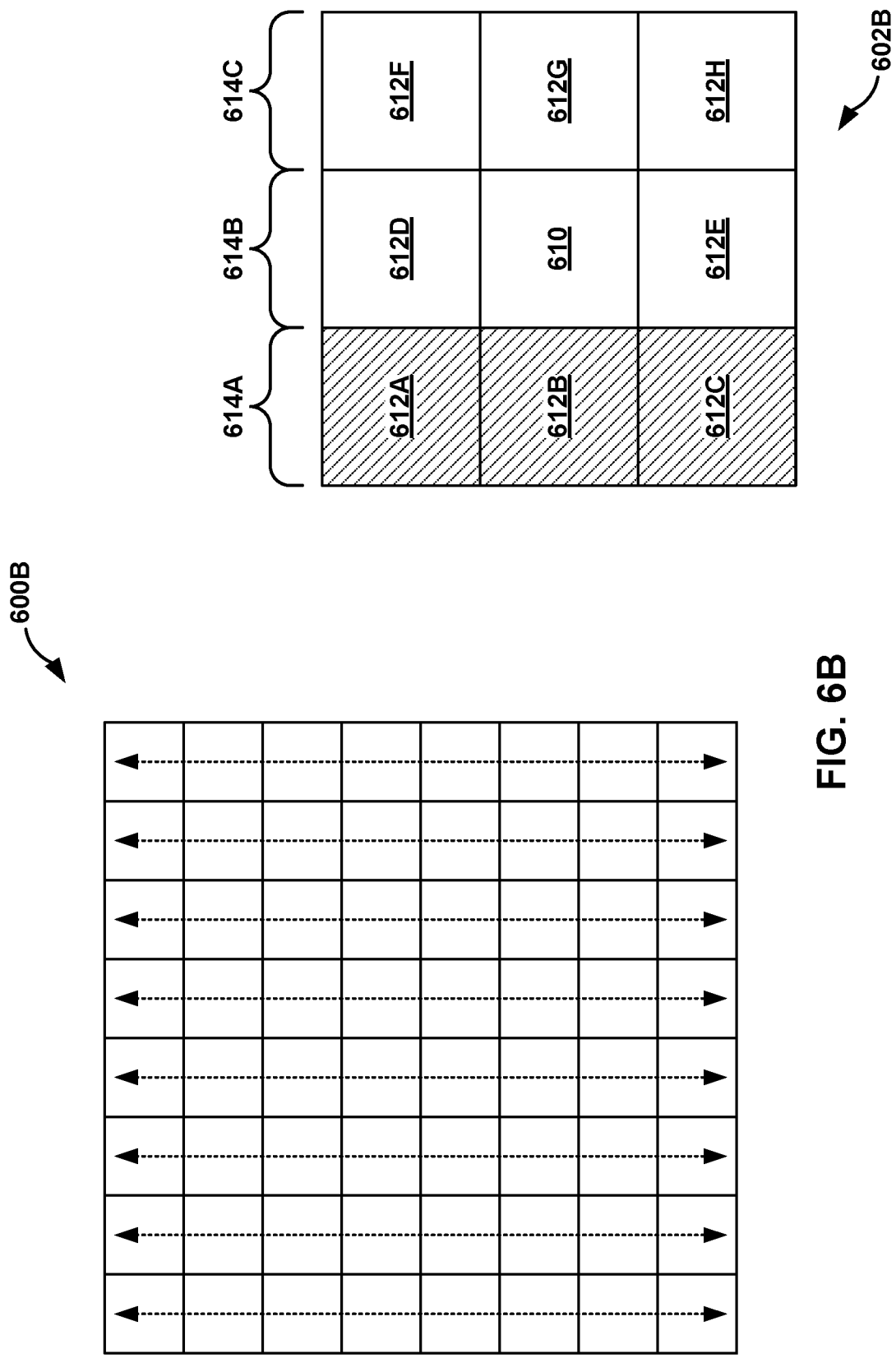

FIGS. 6A and 6B, collectively FIG. 6, are conceptual diagrams illustrating example supports for a recursive filter applied to prediction blocks, in accordance with one or more techniques of this disclosure. FIG. 6 illustrates filter support 602A that may be used to recursively filter samples of block 600A in a horizontal scanning direction, and filter support 602B that may be used to recursively filter samples of block 600B in a vertical scanning direction.

To filter a current sample in a current line using either of filter supports 602A and 602B (collectively, "filter supports 602"), a video coder may use the unfiltered value of a current sample in a current line, one or more already recursively filtered values of samples in a previous line, and one or more unfiltered values of samples in the current line. In the example of FIG. 6A where the scanning direction is horizontal, a video coder may generate a recursively filtered value for sample 604 in current row 608B based on the unfiltered value of sample 604, the recursively filtered values of samples 606A-606C in previous row 608A, and the unfiltered values of samples 606D and 606E in current row 608B. Similarly, in the example of FIG. 6B where the scanning direction is vertical, a video coder may generate a recursively filtered value for sample 610 in current column 614B based on the unfiltered value of sample 610, the recursively filtered values of samples 612A-612C in previous column 614A, and the unfiltered values of samples 612D and 612E in current column 614B.

In some examples, a video coder may also use one or more unfiltered values of samples in one or more subsequent lines to generate a filtered value for a sample in a current line. For instance, in the example of FIG. 6A, a video coder may generate a recursively filtered value for sample 604 in current row 608B based on the unfiltered value of sample 604, the recursively filtered values of samples 606A-606C in previous row 608A, the unfiltered values of samples 606D and 606E in current row 608B, and the unfiltered values of samples 606F-606H in next row 608C. Similarly, in the example of FIG. 6B, a video coder may generate a recursively filtered value for sample 610 in current column 614B based on the unfiltered value of sample 610, the recursively filtered values of samples 612A-612C in previous column 614A, the unfiltered values of samples 612D and 612E in current column 614B, and the unfiltered values of samples 612F-612H in next column 614C.

In some examples, a video coder may also use one or more filtered values of samples in more than one preceding line to generate a filtered value for a sample in a current line. For instance, a video coder may use one or more filtered values of samples in a row above row 608A or one or more filtered values of samples in a column to the left of column 614A.

It should be understood that the top-to-bottom order of FIG. 6A and the left-to-right order of FIG. 6B are merely illustrative and a video coder may perform the techniques of this disclosure in the opposite directions. For instance, a video coder may use a hybrid-recursive filter in a horizontal scanning direction from bottom-to-top or in a vertical scanning direction from right-to-left.

As exemplified in the figures, the recursive filtering computation can be done in parallel along full rows or columns of pixels, which may be much simpler and more efficient than along diagonal lines. For instance, using the hybrid-recursive filter, a video coder may be able to compute filtered values for each sample along a dashed line in parallel.

In general, a video coder may perform filtering in the horizontal scanning direction in accordance with Equation (6) and/or filtering the vertical scanning direction in accordance with Equation (7), below, where q[i,j] represents the filtered sample at position [i,j]; p[i,j] represents the unfiltered sample at position [i,j]; $a_{k,l,m}$ and $b_{k,l,m}$ are filter parameters; m indicates the scanning direction, $R_0$, $R_1$, and $R_2$ define which filtered samples are used to generate the filtered sample at position [i,j]; and $S_0$, $S_1$, and $S_2$ define which unfiltered samples are used to generate the filtered sample at position [i,j].

$$q[i,j] = \sum_{l=-R_0}^{R_1} \sum_{k=1}^{R_2} a_{k,l,m} \cdot q[i-k, j+l] + \sum_{l=-S_0}^{S_1} \sum_{k=0}^{S_2} b_{k,l,m} \cdot p[i+k, j+l] \quad (6)$$

$$q[i,j] = \sum_{k=-R_0}^{R_1} \sum_{l=1}^{R_2} a_{k,l,m} \cdot q[i+k, j-l] + \sum_{k=-S_0}^{S_1} \sum_{l=0}^{S_2} b_{k,l,m} \cdot p[i+k, j+l] \quad (7)$$

In Equation (6) and Equation (7), if $R_0=R_1=R_2=1$ and $S_0=S_1=S_2=1$, the respective result would be a two-dimensional hybrid filter applied to 3×3 blocks of prediction values, such as filter supports 602A and 602B.

To simplify the notation in Equation (6) and Equation (7), the special cases at the borders of the predicted blocks (i.e., cases when i or j are equal to N−1) are not considered. In some examples, the border pixel values may be repeated, which may be equivalent to replacing p[i+k,j+l] with p[min(i+k, N−1), min(j+l, N−1)] in Equation (6) and Equation (7).

In some examples, the filters can also be block-position-dependent. For instance, in Equation (6) and Equation (7), the set of filter parameters $a_{k,l,m}$ and $b_{k,l,m}$ may be replaced a position-dependent set of filter parameters $a_{i,j,k,l,m}$ and $b_{i,j,k,l,m}$. Hence, in some examples, the filter applied to samples of the initial predictive block for locations other than the top row and leftmost column is a first filter, and for each at least a particular sample of the initial predictive block at a location in the top row or the leftmost column of the initial predictive block, a video coder may apply a second, different filter to determine a particular filtered sample in the modified predictive block, the particular filtered sample and the particular sample of the initial predictive block corresponding to a same location within the block.

Figure 7:
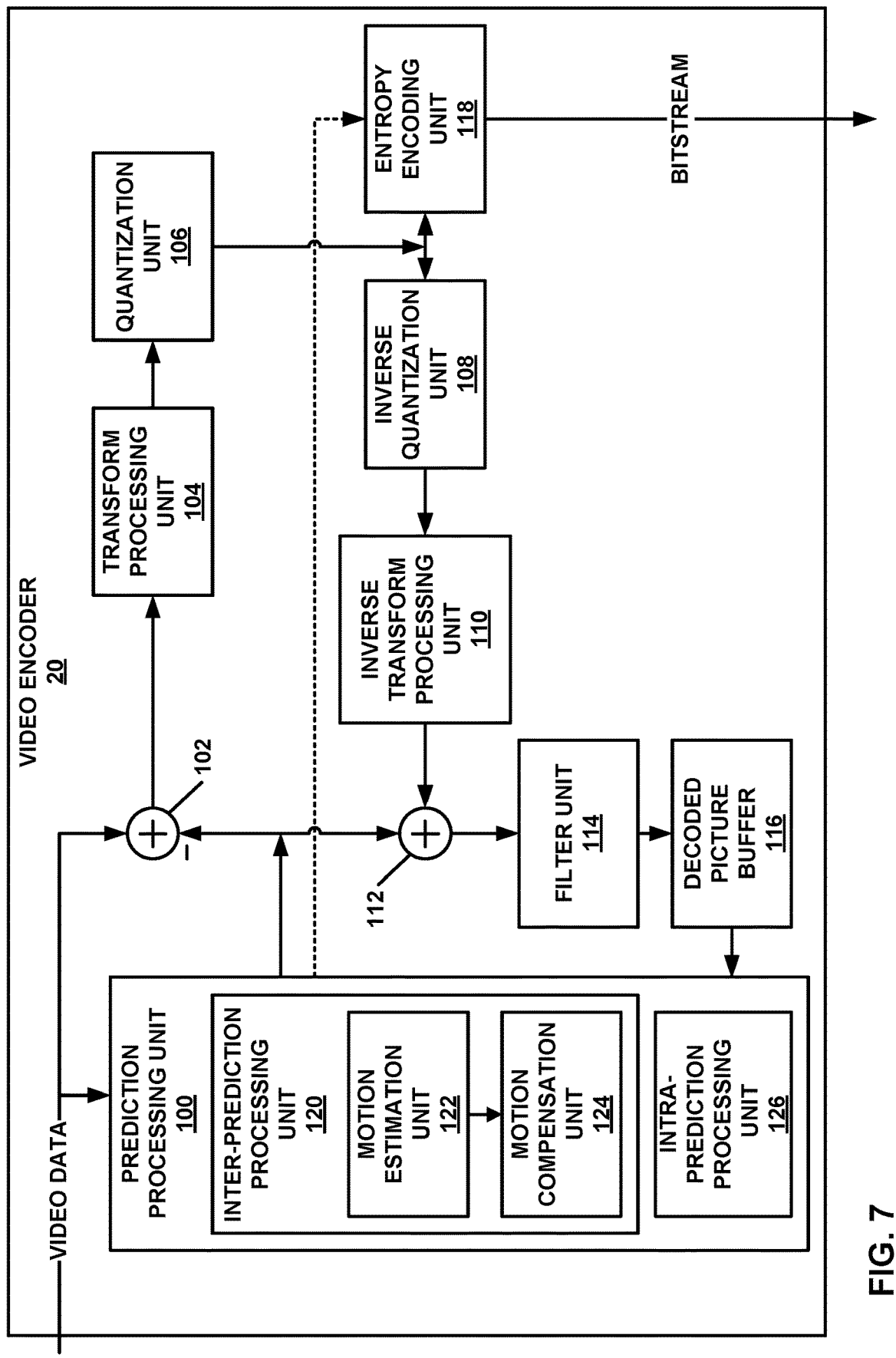
FIG. 7 is a block diagram illustrating an example video encoder that may implement the techniques described in the present disclosure.

FIG. 7 is a block diagram illustrating an example video encoder that may implement the techniques described in this disclosure. FIG. 7 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 7, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

In some examples, video encoder 20 may further include video data memory. The video data memory may store video data to be encoded by the components of video encoder 20. The video data stored in video data memory may be obtained, for example, from video source 18. Decoded picture buffer 116 may be a reference picture memory that stores reference video data for use in encoding video data by video encoder 20, e.g., in intra- or inter-coding modes. The video data memory and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. The video data memory and decoded picture buffer 116 may be provided by the same memory device or separate memory devices. In various examples, the video data memory may be on-chip with other components of video encoder 20, or off-chip relative to those components.

Video encoder 20 may receive video data. Video encoder 20 may encode each CTU in a slice of a picture of the video data. Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Intra-prediction processing unit 126 may perform intra prediction using an intra prediction mode to generate an initial predictive block for a block of the video data. In accordance with one or more techniques of this disclosure, intra-prediction processing unit 126 may use a hybrid-recursive filter to filter the initial predictive block. For instance, intra-prediction processing unit 126 may filter, in parallel, samples in a current line of a plurality of lines of the initial predictive block based on filtered samples in a preceding line of the plurality of lines of the initial predictive block and unfiltered samples in the current line to generate filtered samples for the current line of the initial predictive block, wherein the plurality of lines comprises either a plurality of rows or a plurality of columns of the video data. In some examples, intra-prediction processing unit 126 may filter the samples in the current line in accordance with Equation (6) or Equation (7), depending on whether intra-prediction processing unit determined the filtering direction to be horizontal or vertical. In some examples, each line of the plurality of lines may include a same quantity of non-border samples, intra-prediction processing unit 126 may filter samples in each respective line of the plurality of lines by filtering, in parallel, each non-border sample of a respective line to generate filtered non-border samples for the respective line.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb, and Cr coding blocks) of a CU and the selected predictive blocks of the PUs of the CU, residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU. As discussed above, residual generation unit 102 may generate the residual values for a current block using values of a hybrid-recursively filtered predictive block for the current block.

Thus, in accordance with an example of this disclosure, video encoder 20 may determine residual data based on a difference between the block and the modified predictive block mentioned in the example above. Video encoder 20 may include, in a bitstream that comprises an encoded representation of the video data, data based on the residual data.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture containing the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a CAVLC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream including entropy-encoded data generated by entropy encoding unit 118.

Figure 8:
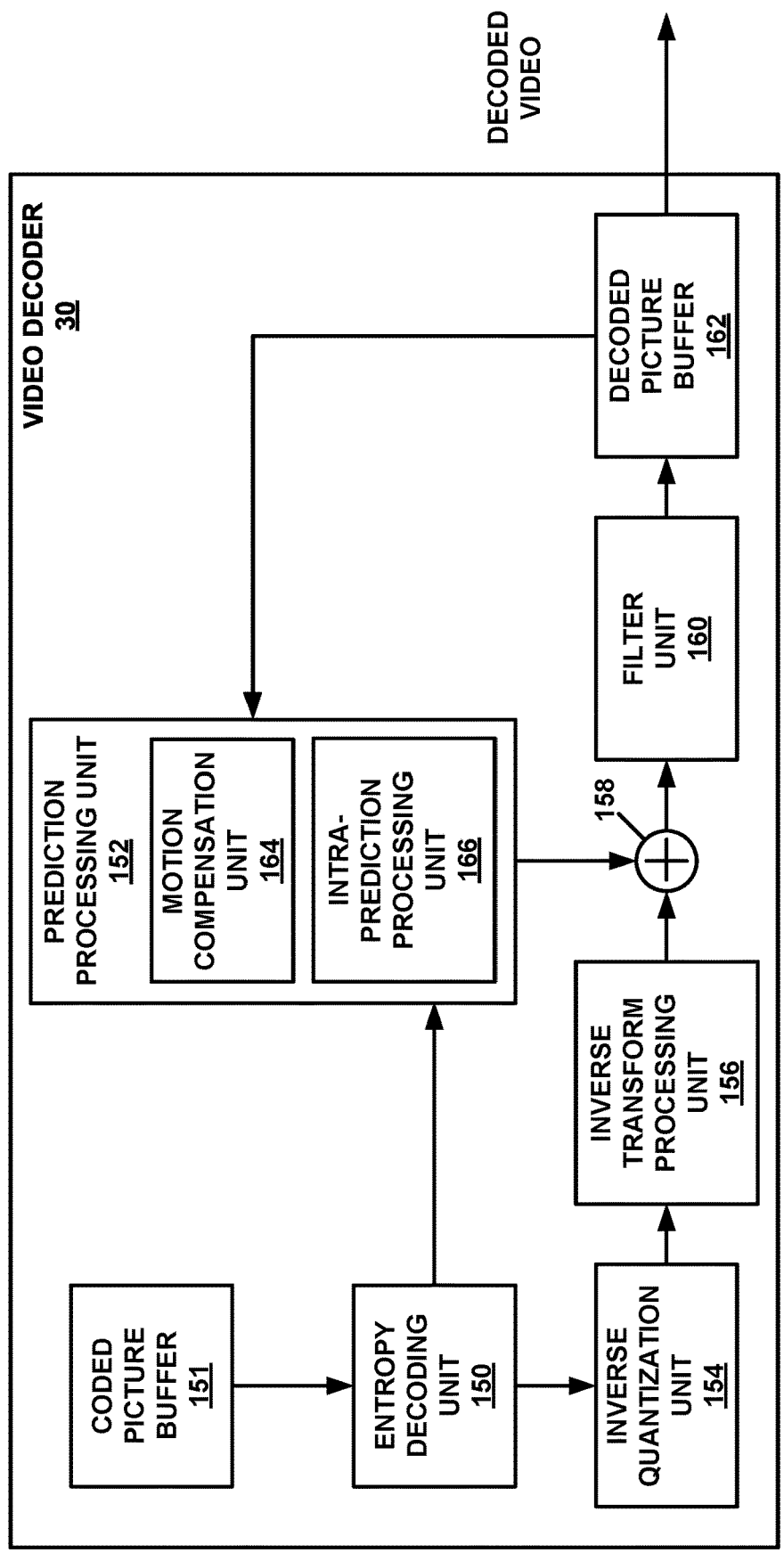
FIG. 8 is a block diagram illustrating an example video decoder that may implement the techniques described in the present disclosure.

FIG. 8 is a block diagram illustrating an example video decoder that may implement the techniques described in this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 8, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

In some examples, video decoder 30 may further include video data memory. The video data memory may store video data, such as an encoded video bitstream, to be decoded by the components of video decoder 30. The video data stored in the video data memory may be obtained, for example, from channel 16 of FIG. 1, e.g., from a local video source, such as a camera, via wired or wireless network communication of video data, or by accessing physical data storage media. The video data memory may form a coded picture buffer (CPB) 151 that stores encoded video data from an encoded video bitstream. CPB 151 may be a reference picture memory that stores reference video data for use in decoding video data by video decoder 30, e.g., in intra- or inter-coding modes. The video data memory and CPB 151 may be formed by any of a variety of memory devices, such as dynamic random access memory (DRAM), including synchronous DRAM (SDRAM), magnetoresistive RAM (MRAM), resistive RAM (RRAM), or other types of memory devices. The video data memory and CPB 151 may be provided by the same memory device or separate memory devices. In various examples, the video data memory may be on-chip with other components of video decoder 30, or off-chip relative to those components.

Coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream.

The NAL units of the bitstream may include coded slice NAL units. As part of decoding the bitstream, entropy decoding unit 150 may parse and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., predictive luma, Cb, and Cr blocks) for the PU based on the prediction blocks of spatially-neighboring PUs. Intra-prediction processing unit 166 may determine the intra prediction mode for the PU based on one or more syntax elements decoded from the bitstream.

Intra-prediction processing unit 166 may perform intra prediction using an intra prediction mode to generate an initial predictive block for a block of the video data. In accordance with one or more techniques of this disclosure, intra-prediction processing unit 166 may use a hybrid-recursive filter to filter the initial predictive block. For instance, intra-prediction processing unit 166 may filter, in parallel, samples in a current line of a plurality of lines of the initial predictive block based on filtered samples in a preceding line of the plurality of lines of the initial predictive block and unfiltered samples in the current line to generate filtered samples for the current line of the initial predictive block, wherein the plurality of lines comprises either a plurality of rows or a plurality of columns of the video data. In some examples, intra-prediction processing unit 166 may filter the samples in the current line in accordance with Equation (6) or Equation (7), depending on whether intra-prediction processing unit determined the filtering direction to be horizontal or vertical. In some examples, each line of the plurality of lines may include a same quantity of non-border samples, intra-prediction processing unit 166 may filter samples in each respective line of the plurality of lines by filtering, in parallel, each non-border sample of a respective line to generate filtered non-border samples for the respective line.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive blocks (e.g., predictive luma, Cb, and Cr blocks) for the PU.

Reconstruction unit 158 may use the residual values from the transform blocks (e.g., luma, Cb, and Cr transform blocks) of TUs of a CU and the predictive blocks (e.g., luma, Cb, and Cr blocks) of the PUs of the CU, i.e., either intra-prediction data or inter-prediction data, as applicable, to reconstruct the coding blocks (e.g., luma, Cb, and Cr coding blocks) of the CU. For example, reconstruction unit 158 may add samples of the transform blocks to corresponding samples of the predictive blocks to reconstruct the coding blocks of the CU. As discussed above, reconstruction unit 158 may reconstruct an intra-predicted current block by adding the residual values to values of a hybrid-recursively filtered predictive block for the current block.

Thus, in accordance with an example of this disclosure, video decoder 30 may determine, based on syntax elements obtained from a bitstream comprising an encoded representation of the video data, residual data. Furthermore, video decoder 30 may reconstruct, based on the modified predictive block mentioned in the example above and the residual data, the block of the video data.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations on PUs of other CUs. In this way, video decoder 30 may reconstruct blocks of video data based on data in a bitstream.

Figure 9:
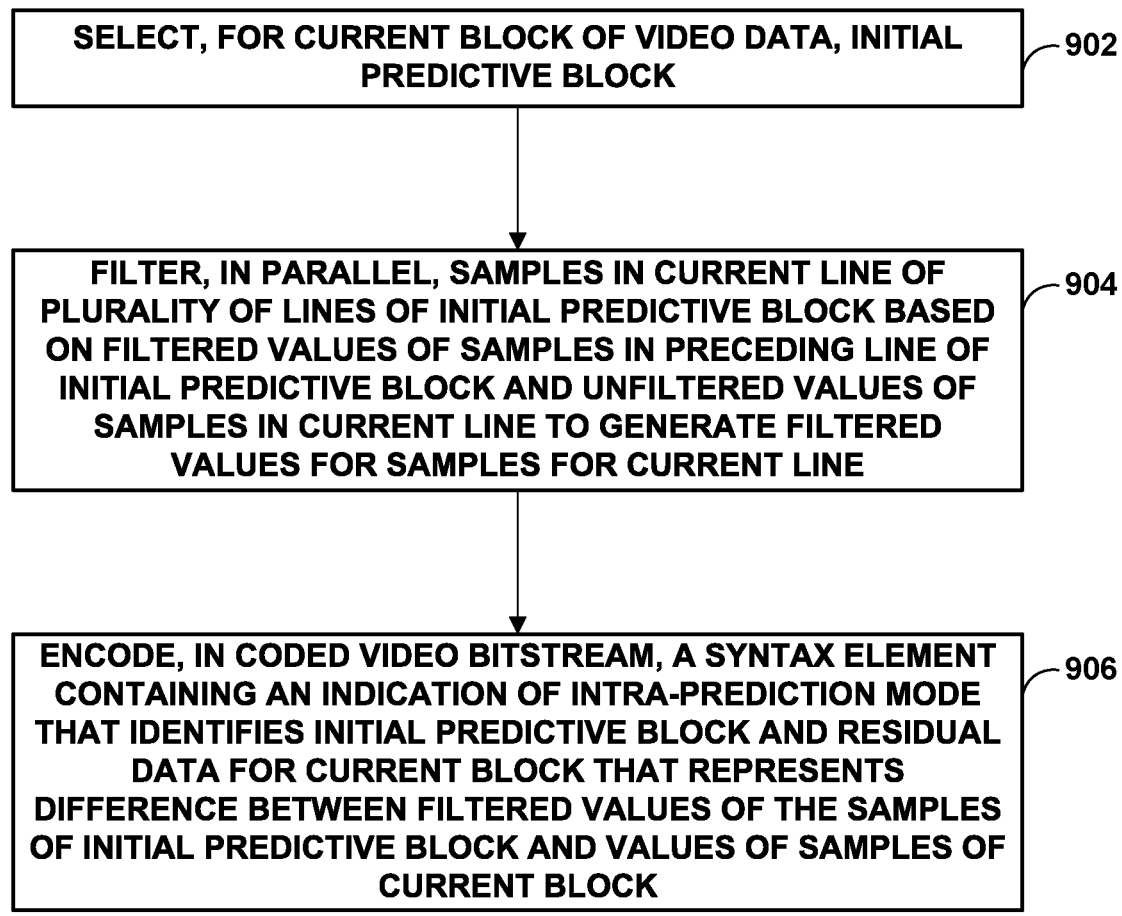
FIG. 9 is a flow diagram illustrating example operations of a video encoder to encode a block of video data of a picture using a hybrid recursive filter, in accordance with one or more techniques of the present disclosure.

FIG. 9 is a flow diagram illustrating example operations of a video encoder to encode a block of video data of a picture using a hybrid recursive filter, in accordance with one or more techniques of the present disclosure. The techniques of FIG. 9 may be performed by one or more video encoders, such as video encoder 20 illustrated in FIGS. 1 and 7. For purposes of illustration, the techniques of FIG. 9 are described within the context of video encoder 20, although video encoders having configurations different than that of video encoder 20 may perform the techniques of FIG. 9.

Video encoder 20 may select, for a current block of the video data, an initial predictive block (902). For instance, intra-prediction processing unit 126 may evaluate a plurality of candidate predictive blocks identified by a plurality of intra-prediction modes and select the candidate predictive that most closely matches the current block, in terms of pixel difference, which may be determined by sum of absolute difference (SAD), sum of square difference (SSD), or other difference metrics.

In accordance with one or more techniques of this disclosure, video encoder 20 may filter, in parallel, (1) samples in a current line of a plurality of lines of the initial predictive block based on filtered values of samples in a preceding line of the plurality of lines of the initial predictive block and (2) unfiltered values of samples in the current line to (3) generate filtered values for samples for the current line of the initial predictive block (904). As one example, where the plurality of lines comprises a plurality of rows such that a filtering direction is horizontal, intra-prediction processing unit 126 may filter the samples in the current line in accordance with Equation (6), above. As another example, where the plurality of lines comprises a plurality of columns such that a filtering direction is vertical, intra-prediction processing unit 126 may filter the samples in the current line in accordance with Equation (7), above.

Video encoder 20 may encode, in a coded video bitstream, an indication of an intra-prediction mode that identifies the initial predictive block and residual data for the current block that represents a difference between the filtered values of the samples of the initial predictive block and the values of samples of the current block (906). For instance, video encoder 20 may encode one or more syntax elements that indicate the intra-prediction mode that identifies the initial predictive block. Video encoder 20 may reconstruct, using intra prediction, values of samples of the current block based on the filtered values of the samples of the current initial predictive block and residual data for the current block that represents a difference between the filtered values of the samples of the current initial predictive block and the values of samples of the current block.

Figure 10:
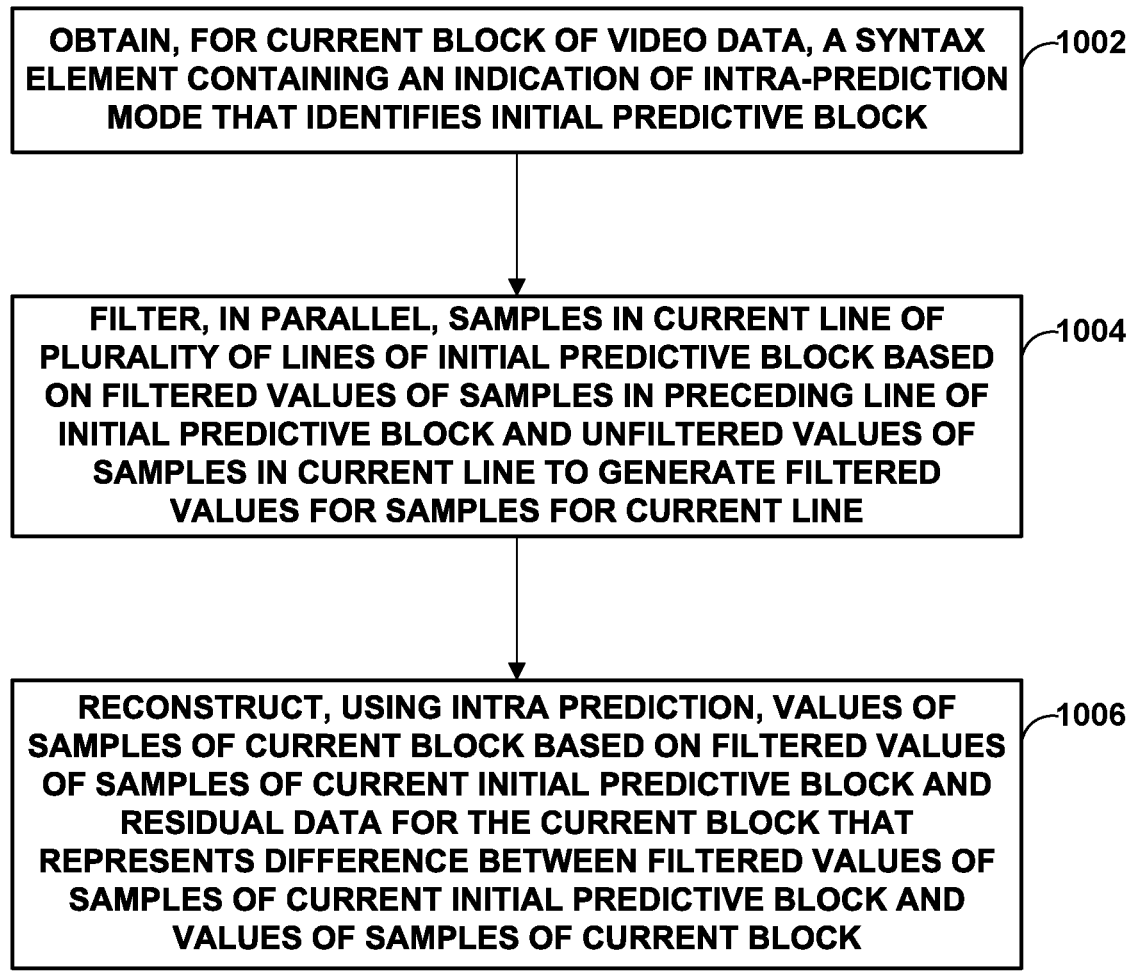
FIG. 10 is a flow diagram illustrating example operations of a video decoder to decode a block of video data of a picture using a hybrid recursive filter, in accordance with one or more techniques of the present disclosure.

FIG. 10 is a flow diagram illustrating example operations of a video decoder to decode a block of video data of a picture using a hybrid recursive filter, in accordance with one or more techniques of the present disclosure. The techniques of FIG. 10 may be performed by one or more video decoders, such as video decoder 30 illustrated in FIGS. 1 and 8. For purposes of illustration, the techniques of FIG. 10 are described within the context of video decoder 30, although video decoders having configurations different than that of video decoder 30 may perform the techniques of FIG. 10.

Video decoder 30 may obtain, from a coded video bitstream and for a current block of the video data, a syntax element containing an indication of an intra-prediction mode that identifies an initial predictive block (1002).

In accordance with one or more techniques of this disclosure, video decoder 30 may filter, in parallel, (1) samples in a current line of a plurality of lines of the initial predictive block based on filtered values of samples in a preceding line of the plurality of lines of the initial predictive block and (2) unfiltered values of samples in the current line to (3) generate filtered values for samples for the current line of the initial predictive block (1004). As one example, where the plurality of lines comprises a plurality of rows such that a filtering direction is horizontal, intra-prediction processing unit 166 may filter the samples in the current line in accordance with Equation (6), above. As another example, where the plurality of lines comprises a plurality of columns such that a filtering direction is vertical, intra-prediction processing unit 166 may filter the samples in the current line in accordance with Equation (7), above.

Video decoder 30 may reconstruct, using intra prediction, values of samples of the current block based on the filtered values of the samples of the current initial predictive block and residual data for the current block that represents a difference between the filtered values of the samples of the current initial predictive block and the values of samples of the current block (1006).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples, and particular combinations thereof, are within the scope of the following claims.

What is claimed is:

1. A method of decoding video data, the method comprising:
obtaining, from a coded video bitstream and for a current block of the video data, an indication of an intra-prediction mode that identifies an initial predictive block;
filtering samples in a current line of a plurality of lines of the initial predictive block based on filtered values of samples in a preceding line of the plurality of lines of the initial predictive block and unfiltered values of one or more samples in the current line to generate filtered values for samples for the current line of the initial predictive block, wherein the plurality of lines comprises either a plurality of rows or a plurality of columns of the video data; and
reconstructing, using intra prediction, values of samples of the current block based on the filtered values of the samples of the current initial predictive block and residual data for the current block that represents a difference between the filtered values of the samples of the current initial predictive block and the values of samples of the current block.

2. The method of claim 1, wherein each line of the plurality of lines comprises a same quantity of non-border samples, and wherein filtering samples in each respective line of the plurality of lines comprises:
filtering each non-border sample of a respective line to generate filtered non-border samples for the respective line.

3. The method of claim 1, wherein filtering samples in each respective line of the plurality of lines comprises:
filtering each sample of a respective line to generate filtered samples for the respective line.

4. The method of claim 1, wherein the filtering of the samples of the current line is further based on unfiltered samples in a following line of the plurality of lines of the initial predictive block.

5. The method of claim 1, wherein the filtering of the samples of the current line is further based on unfiltered samples in a plurality of preceding lines of the plurality of lines of the initial predictive block that includes the preceding line.

6. The method of claim 1, wherein filtering the samples in the current line comprises filtering the samples in the current line in accordance with the following equation where the plurality of lines comprises the plurality of rows:

$$q[i,j] = \sum_{l=-R_0}^{R_1} \sum_{k=1}^{R_2} a \cdot q[i-k, j+l] + \sum_{l=-S_0}^{S_1} \sum_{k=0}^{S_2} b \cdot p[i+k, j+l]$$

or the following equation where the plurality of lines comprises the plurality of columns:

$$q[i,j] = \sum_{k=-R_0}^{R_1} \sum_{l=1}^{R_2} a \cdot q[i+k, j-l] + \sum_{k=-S_0}^{S_1} \sum_{l=0}^{S_2} b \cdot p[i+k, j+l]$$

where q[i,j] represents the filtered sample at position [i,j]; p[i,j] represents the unfiltered sample at position [i,j]; a and b are filter parameters; $R_0$, $R_1$, and $R_2$ define which filtered samples are used to generate the filtered sample at position [i,j]; and $S_0$, $S_1$, and $S_2$ define which unfiltered samples are used to generate the filtered sample at position [i,j].

7. The method of claim 1, wherein the current block of the video data is M by N samples, and wherein filtering the samples in the current line comprises filtering the samples in the current line in accordance with the following equation where the plurality of lines comprises the plurality of rows:

$$q[i, j] = \sum_{l=-R_0}^{R_1} \sum_{k=1}^{R_2} a \cdot q[i-k, j+l]$$
$$+ \sum_{l=-S_0}^{S_1} \sum_{k=0}^{S_2} b \cdot p[\min (i+k, M+1), \min (j+l, N-1)]$$

or the following equation where the plurality of lines comprises the plurality of columns:

$$q[i, j] = \sum_{k=-R_0}^{R_1} \sum_{l=1}^{R_2} a \cdot q[i+k, j-l] +$$
$$\sum_{k=-S_0}^{S_1} \sum_{l=0}^{S_2} b \cdot p[\min (i+k, M-1), \min (j+l, N-1)]$$

where q[i,j] represents the filtered sample at position [i,j]; p[i,j] represents the unfiltered sample at position [i,j]; a and b are filter parameters; $R_0$, $R_1$, and $R_2$ define which filtered samples are used to generate the filtered sample at position [i,j]; and $S_0$, $S_1$, and $S_2$ define which unfiltered samples are used to generate the filtered sample at position [i,j].

8. A method of encoding video data, the method comprising:
 selecting, for a current block of the video data, an initial predictive block;
 filtering samples in a current line of a plurality of lines of the initial predictive block based on filtered values of one or more samples in a preceding line of the plurality of lines of the initial predictive block and unfiltered values of samples in the current line to generate filtered values for samples for the current line of the initial predictive block, wherein the plurality of lines comprises either a plurality of rows or a plurality of columns of the video data; and
 encoding, in a coded video bitstream, an indication of an intra-prediction mode that identifies the initial predictive block and residual data for the current block that represents a difference between the filtered values of the samples of the initial predictive block and the values of samples of the current block.

9. The method of claim 8, wherein each line of the plurality of lines comprises a same quantity of non-border samples, and wherein filtering samples in each respective line of the plurality of lines comprises:
 filtering each non-border sample of a respective line to generate filtered non-border samples for the respective line.

10. The method of claim 8, wherein filtering samples in each respective line of the plurality of lines comprises:
 filtering each sample of a respective line to generate filtered samples for the respective line.

11. The method of claim 8, wherein the filtering of the samples of the current line is further based on unfiltered samples in a following line of the plurality of lines of the initial predictive block.

12. The method of claim 8, wherein the filtering of the samples of the current line is further based on unfiltered samples in a plurality of preceding lines of the plurality of lines of the initial predictive block that includes the preceding line.

13. The method of claim 8, wherein filtering the samples in the current line comprises filtering the samples in the current line in accordance with the following equation where the plurality of lines comprises the plurality of rows:

$$q[i, j] = \sum_{l=-R_0}^{R_1} \sum_{k=1}^{R_2} a \cdot q[i-k, j+l] + \sum_{l=-S_0}^{S_1} \sum_{k=0}^{S_2} b \cdot p[i+k, j+l]$$

or the following equation where the plurality of lines comprises the plurality of columns:

$$q[i, j] = \sum_{k=-R_0}^{R_1} \sum_{l=1}^{R_2} a \cdot q[i+k, j-l] + \sum_{k=-S_0}^{S_1} \sum_{l=0}^{S_2} b \cdot p[i+k, j+l]$$

where q[i,j] represents the filtered sample at position [i,j]; p[i,j] represents the unfiltered sample at position [i,j]; a and b are filter parameters; $R_0$, $R_1$, and $R_2$ define which filtered samples are used to generate the filtered sample at position [i,j]; and $S_0$, $S_1$, and $S_2$ define which unfiltered samples are used to generate the filtered sample at position [i,j].

14. The method of claim 8, wherein the current block of the video data is M by N samples, and wherein filtering the samples in the current line comprises filtering the samples in the current line in accordance with the following equation where the plurality of lines comprises the plurality of rows:

$$q[i, j] = \sum_{l=-R_0}^{R_1} \sum_{k=1}^{R_2} a \cdot q[i-k, j+l] +$$
$$\sum_{l=-S_0}^{S_1} \sum_{k=0}^{S_2} b \cdot p[\min (i+k, M-1), \min (j+l, N-1)]$$

or the following equation where the plurality of lines comprises the plurality of columns:

$$q[i, j] = \sum_{k=-R_0}^{R_1} \sum_{l=1}^{R_2} a \cdot q[i+k, j-l] +$$
$$\sum_{k=-S_0}^{S_1} \sum_{l=0}^{S_2} b \cdot p[\min (i+k, M-1), \min (j+l, N-1)]$$

where q[i,j] represents the filtered sample at position [i,j]; p[i,j] represents the unfiltered sample at position [i,j]; a and b are filter parameters; $R_0$, $R_1$, and $R_2$ define which filtered samples are used to generate the filtered sample at position [i,j]; and $S_0$, $S_1$, and $S_2$ define which unfiltered samples are used to generate the filtered sample at position [i,j].

15. A device for encoding or decoding video data, the device comprising:

a memory configured to store a portion of the video data; and one or more processors configured to:

identify, for a current block of the video data, an initial predictive block;

filter samples in a current line of a plurality of lines of the initial predictive block based on filtered values of samples in a preceding line of the plurality of lines of the initial predictive block and unfiltered values of one or more samples in the current line to generate filtered values for samples for the current line of the initial predictive block, wherein the plurality of lines comprises either a plurality of rows or a plurality of columns of the video data; and reconstruct, using intra prediction, values of samples of the current block based on the filtered values of the samples of the current initial predictive block and residual data for the current block that represents a difference between the filtered values of the samples of the current initial predictive block and the values of samples of the current block.

16. The device of claim 15, wherein each line of the plurality of lines comprises a same quantity of non-border samples, and wherein, to filter samples in each respective line of the plurality of lines, the one or more processors are configured to:

filter each non-border sample of a respective line to generate filtered non-border samples for the respective line.

17. The device of claim 15, wherein, to filter samples in each respective line of the plurality of lines, the one or more processors are configured to:

filter each sample of a respective line to generate filtered samples for the respective line.

18. The device of claim 15, wherein the one or more processors are further configured to filter the samples of the current line based on unfiltered samples in a following line of the plurality of lines of the initial predictive block.

19. The device of claim 15, wherein the one or more processors are further configured to filter the samples of the current line based on unfiltered samples in a plurality of preceding lines of the plurality of lines of the initial predictive block that includes the preceding line.

20. The device of claim 15, wherein the one or more processors are configured to filter the samples in the current line in accordance with the following equation where the plurality of lines comprises the plurality of rows:

$$q[i,j] = \sum_{l=-R_0}^{R_1} \sum_{k=1}^{R_2} a \cdot q[i-k, j+l] + \sum_{l=-S_0}^{S_1} \sum_{k=0}^{S_2} b \cdot p[i+k, j+l]$$

or the following equation where the plurality of lines comprises the plurality of columns:

$$q[i,j] = \sum_{k=-R_0}^{R_1} \sum_{l=1}^{R_2} a \cdot q[i+k, j-l] + \sum_{k=-S_0}^{S_1} \sum_{l=0}^{S_2} b \cdot p[i+k, j+l]$$

where q[i,j] represents the filtered sample at position [i,j]; p[i,j] represents the unfiltered sample at position [i,j]; a and b are filter parameters; $R_0$, $R_1$, and $R_2$ define which filtered samples are used to generate the filtered sample at position [i,j]; and $S_0$, $S_1$, and $S_2$ define which unfiltered samples are used to generate the filtered sample at position [i,j].

* * * * *